United States Patent
Sakamaki et al.

[11] Patent Number: 6,144,909
[45] Date of Patent: Nov. 7, 2000

[54] POWER STEERING SYSTEM WITH HYDRAULIC PUMP MOTOR SPEED CONTROL

[75] Inventors: Masahiko Sakamaki, Yao; Hiroaki Kaji, Yamatokooriyama, both of Japan

[73] Assignee: Koyo Seiko Co., Ltd., Osaka, Japan

[21] Appl. No.: 09/284,139

[22] PCT Filed: Aug. 13, 1997

[86] PCT No.: PCT/JP97/02831

§ 371 Date: Apr. 13, 1999

§ 102(e) Date: Apr. 13, 1999

[87] PCT Pub. No.: WO99/08922

PCT Pub. Date: Feb. 25, 1999

[51] Int. Cl.[7] .............................. B62D 5/07; B62D 6/00
[52] U.S. Cl. ........................................... 701/41; 180/443
[58] Field of Search ................................ 701/41; 180/443

[56] References Cited

U.S. PATENT DOCUMENTS

| | | | |
|---|---|---|---|
| 4,549,627 | 10/1985 | Takeshima et al. | 180/422 |
| 4,552,240 | 11/1985 | Takeshima et al. | 180/422 |
| 5,372,214 | 12/1994 | Haga et al. | 180/422 |
| 5,761,627 | 6/1998 | Seidel et al. | 701/41 |

FOREIGN PATENT DOCUMENTS

| | | |
|---|---|---|
| 5-69844 | 3/1993 | Japan . |
| 6-107215 | 4/1994 | Japan . |
| 6-206572 | 7/1994 | Japan . |
| 6-263046 | 9/1994 | Japan . |
| 8-230707 | 9/1996 | Japan . |

*Primary Examiner*—Michael J. Zanelli
*Attorney, Agent, or Firm*—Rabin & Champagne, PC

[57] ABSTRACT

A motor is stopped (S14), if a steering angular speed $V\theta$ which is the time-related change rate of a steering angle is not greater than a stop threshold value $Vb$ (YES in S10) and a motor electric current value $Im$ is kept within a motor stop range $\Delta I$ predetermined on the basis of a non-load electric current value for a predetermined time period (YES in S12, S13). The non-load electric current value is an electric current value observed at a steering torque of zero and, therefore, the motor stop range corresponds to a range where no steering assist force is required. That is, when the steering angular speed $V\theta$ and the steering torque are small, the steering assist is regarded unnecessary, and the motor is stopped.

8 Claims, 7 Drawing Sheets

POWER STEERING SYSTEM WITH HYDRAULIC PUMP MOTOR SPEED CONTROL

TECHNICAL FIELD

The present invention relates to a power steering apparatus which applies a steering assist force to a steering mechanism by a hydraulic pressure generated by a pump driven by an electric motor.

BACKGROUND ART

Power steering apparatuses are known which assist operation of a steering wheel by supplying a working oil from an oil pump to a power cylinder coupled to a steering mechanism. The oil pump is driven by an electric motor, and a steering assist force is generated by the power cylinder in accordance with the speed of the electric motor.

Drive control of the electric motor is performed, for example, on the basis of the steering angular speed of the steering wheel. That is, the steering angular speed which corresponds to the time-related change rate of the steering angle of the steering wheel is determined on the basis of an output of a steering angle sensor provided in association with the steering mechanism, and the speed of the electric motor is controlled on the basis of the steering angular speed thus determined.

FIG. 7 is a diagram for explaining the drive control of the electric motor in greater detail, wherein the abscissa and the ordinate represent the steering angular speed Vθ of the steering wheel and the motor speed R, respectively. Where the steering angular speed Vθ is not greater than a predetermined first threshold VT1, the motor speed R is kept at the first speed R1. Where the steering angular speed Vθ is not smaller than a second threshold VT2 which is greater than the first threshold VT1, the motor speed R is kept at a second speed R2 which is greater than the first speed R1. Where the steering angular speed is in a range between the first threshold VT1 and the second threshold VT2, the motor speed R is varied generally linearly with the steering angular speed Vθ between the first speed R1 and the second speed R2.

Through this control, a greater steering assist force is generated as the steering wheel is more quickly turned and, hence, the steering assist can properly be provided.

When a motor vehicle travels straight, the steering wheel is virtually unoperated. In this case, therefore, virtually no steering assist force is required. In the aforesaid electric motor drive control, however, the electric motor is driven at the first speed R1 even if the steering angular speed Vθ is at a value close to zero. Accordingly, the electric motor is kept driven even though no steering assist is required. This makes impossible to avoid wasteful energy consumption.

SUMMARY OF THE INVENTION

It is an object of the present invention to provide a power steering apparatus which ensures energy saving.

The power steering apparatus of the present invention, which is adapted to generate a steering assist force by a hydraulic pressure generated by a pump driven by an electric motor, comprises: steering angular speed detecting means (steering angle sensor 11, CPU 31, and Step S1 in FIG. 2) for detecting a steering angular speed; first control means (CPU 31 and Steps S7, S8 in FIG. 2) for variably setting the speed of the electric motor in accordance with the steering angular speed detected by the steering angular speed detecting means if the steering angular speed is greater than a first predetermined value (VT1); second control means (CPU 31 and Steps S5, S6 in FIG. 2) for setting the speed of the electric motor at a predetermined constant speed if the steering angular speed detected by the steering angular speed detecting means is between the first predetermined value and a second predetermined value (Vb) which is smaller than the first predetermined value; and third control means (CPU 31 and Steps S10 to S14 in FIG. 2) for stopping the electric motor on a predetermined condition if the steering angular speed detected by the steering angular speed detecting means is not greater than the second predetermined value.

In accordance with the present invention, the driving of the electric motor is controlled in accordance with the steering angular speed, whereby a proper steering assist force is applied to a steering mechanism. If the steering angular speed is reduced to not greater than the second predetermined value, the electric motor is stopped on the predetermined condition. Thus, the electric motor can be stopped when no steering assist is required, so that wasteful energy consumption can be suppressed.

In accordance with one embodiment of the present invention, the power steering apparatus further comprises fourth control means (CPU 31 and Steps S3, S4 in FIG. 2) for, when the electric motor is off, actuating the electric motor if the steering angular speed detected by the steering angular speed detecting means is increased to not smaller than a third predetermined value (Va) which is smaller than the second predetermined value.

With this arrangement, a threshold at which the electric motor is to be stopped corresponds to the second predetermined value, and a threshold at which the electric motor is to be actuated corresponds to the third predetermined value which is smaller than the second predetermined value. That is, the electric motor stop/actuation thresholds have a hysteresis with respect to the steering angular speed. Thus, the electric motor can immediately be actuated to generate a steering assist force when the steering operation is started, and the electric motor can immediately be stopped when the steering operation ends. As a result, the improvement of the steering feeling and the enhancement of the energy saving can both be achieved.

The power steering apparatus may further comprise electric current detecting means (electric current detecting circuit 12) for detecting the value of motor electric current flowing through the electric motor, and electric current value judging means (CPU 31 and Step S12 in FIG. 2) for judging whether or not the motor electric current value detected by the electric current detecting means is within a motor stop range which corresponds to a steering torque range where no steering assist is required. In this case, the aforesaid predetermined condition is preferably duration of a predetermined time period during which the electric current value judging means continuously obtains a judgment result that the motor electric current value is within the motor stop range (Step S13 in FIG. 2).

The electric current value of the electric motor varies depending upon a load applied to the motor, i.e., a steering torque. Therefore, if the electric motor is adapted to be stopped in response to duration of the predetermined time period during which the motor electric current value is kept within the motor stop range which corresponds to the steering torque range where no steering assist is required, the electric motor can assuredly be stopped when the steering torque is small. Therefore, the stop control of the electric motor can properly be performed in accordance with the steering torque without the torque sensor.

The power steering apparatus may further comprise non-load electric current value calculating means (CPU 31 and Step U2 in FIG. 4) for determining, on the basis of the motor electric current value detected by the electric current detecting means, a non-load electric current value observed when the electric motor is in a non-load state, and motor stop range determining means (CPU 31 and Step U3 in FIG. 4) for determining the motor stop range on the basis of the non-load electric current value determined by the non-load electric current value calculating means.

When the steering torque is zero, the electric motor is in the non-load state. Therefore, it is considered that, when the motor electric current value is within a predetermined range around the non-load electric current value, the steering torque is virtually zero, so that no steering assist is required. By determining the motor stop range on the basis of the non-load electric current value, the stop control of the motor can properly be performed.

In this case, the motor stop range determining means may be adapted to determine as the motor stop range a range defined between the non-load electric current value and a value obtained by adding a predetermined electric current threshold to the non-load electric current value.

The electric current threshold is preferably determined on the basis of a torque range where a motor vehicle equipped with the power steering apparatus requires no steering assist.

In accordance with another embodiment of the present invention, the power steering apparatus may further comprise torque detecting means (torque sensor 13) for detecting a steering torque, and torque judging means (CPU 31 and Step V2 in FIG. 6) for judging whether or not the steering torque detected by the torque detecting means is within a motor stop torque range where no steering assist is required. In this case, the aforesaid predetermined condition is preferably duration of a predetermined time period during which the torque judging means continuously obtains a judgment result that the steering torque is within the motor stop torque range (Step V3 in FIG. 6).

With this arrangement, the electric motor is stopped in response to the duration of the predetermined time period during which the steering torque is kept within the motor stop torque range, so that the electric motor can assuredly be stopped when the steering torque is small. Therefore, the stop control of the motor can properly be performed in accordance with the steering torque.

The motor stop torque range is preferably predetermined as a range where a motor vehicle equipped with the power steering apparatus requires no steering assist.

The foregoing and other objects, features and effects of the present invention will become more apparent from the following description of the embodiments with reference to the attached drawings.

EMBODIMENTS OF THE INVENTION

Figure 1:
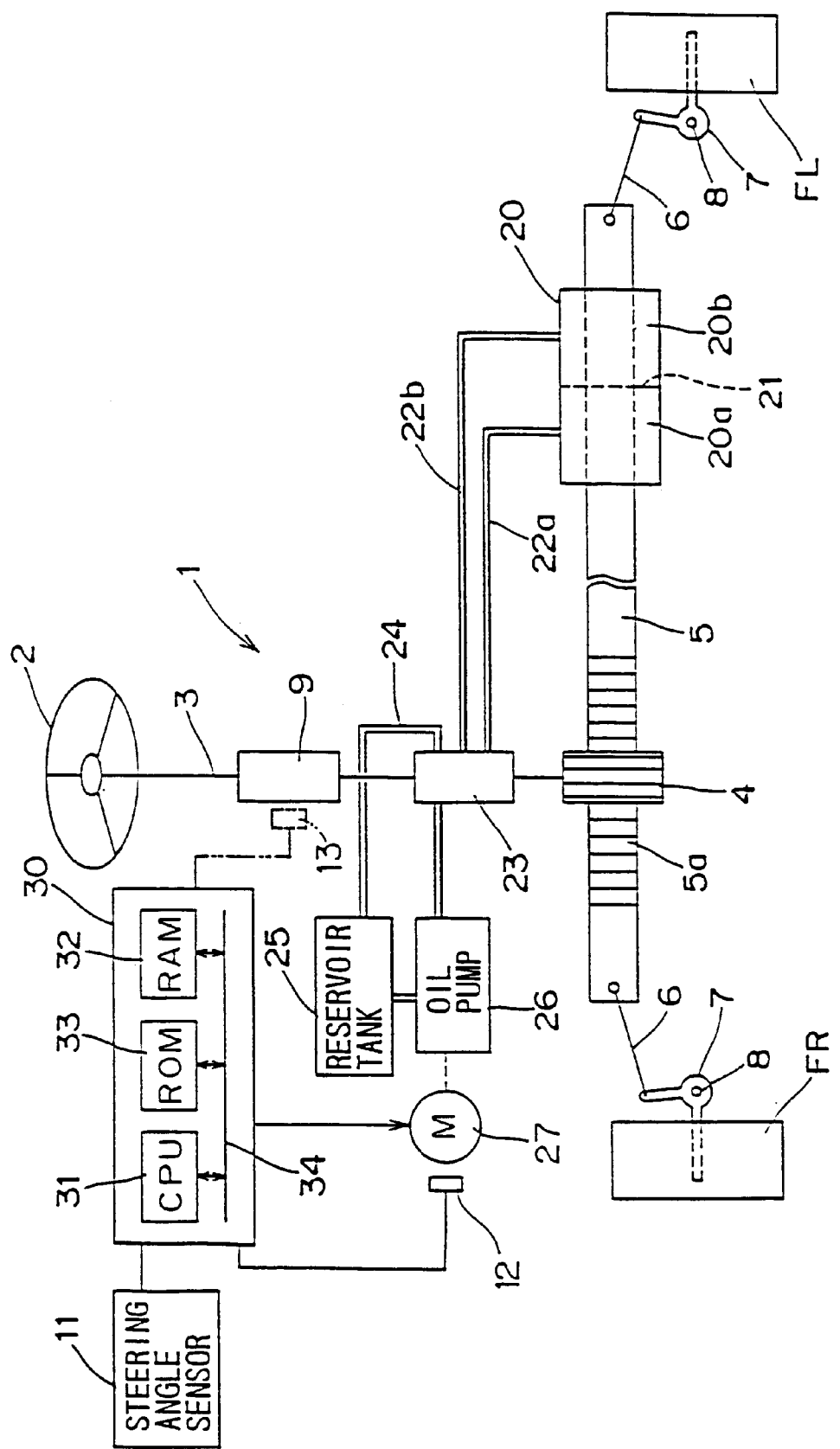
FIG. 1 is a conceptual diagram illustrating a basic construction of a power steering apparatus according to a first embodiment of the present invention.

FIG. 1 is a conceptual diagram illustrating a basic construction of a power steering apparatus according to a first embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the cylinder 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the motor vehicle. Thus, a steering assist force acts on the rack shaft 5.

An exemplary construction of the hydraulic pressure control valve is disclosed in detail, for example, in Japanese Unexamined Patent Publication No. 59-118577 (1984), the disclosure of which is incorporated herein by reference.

The driving of the motor 27 is controlled by an electronic control unit 30. The electronic control unit 30 is comprised of a microprocessor which includes a CPU 31, a RAM 32 which provides a work area for the CPU 31, a ROM 33 storing therein operation programs for the CPU 31, and buses 34 interconnecting the CPU 31, the RAM 32 and the ROM 33.

The electronic control unit 30 receives steering angle data outputted from a steering angle sensor 11. The steering angle sensor 11 is provided in association with the steering wheel 2. The steering angle sensor 11 sets at an initial value "0" a steering angle of the steering wheel 2 observed when an ignition key switch is actuated for startup of an engine, and detects a steering angle relative to the initial value.

The electronic control unit 30 also receives electric current data outputted from an electric current detecting circuit 12. The electric current detecting circuit 12 is provided in association with the motor 27, and outputs electric current data which is proportional to the value of motor electric current flowing through the motor 27.

The electronic control unit 30 controls the driving of the motor 27 on the basis of the steering angle data outputted from the steering angle sensor 11 and the electric current data outputted from the electric current detecting circuit 12.

Figure 2:
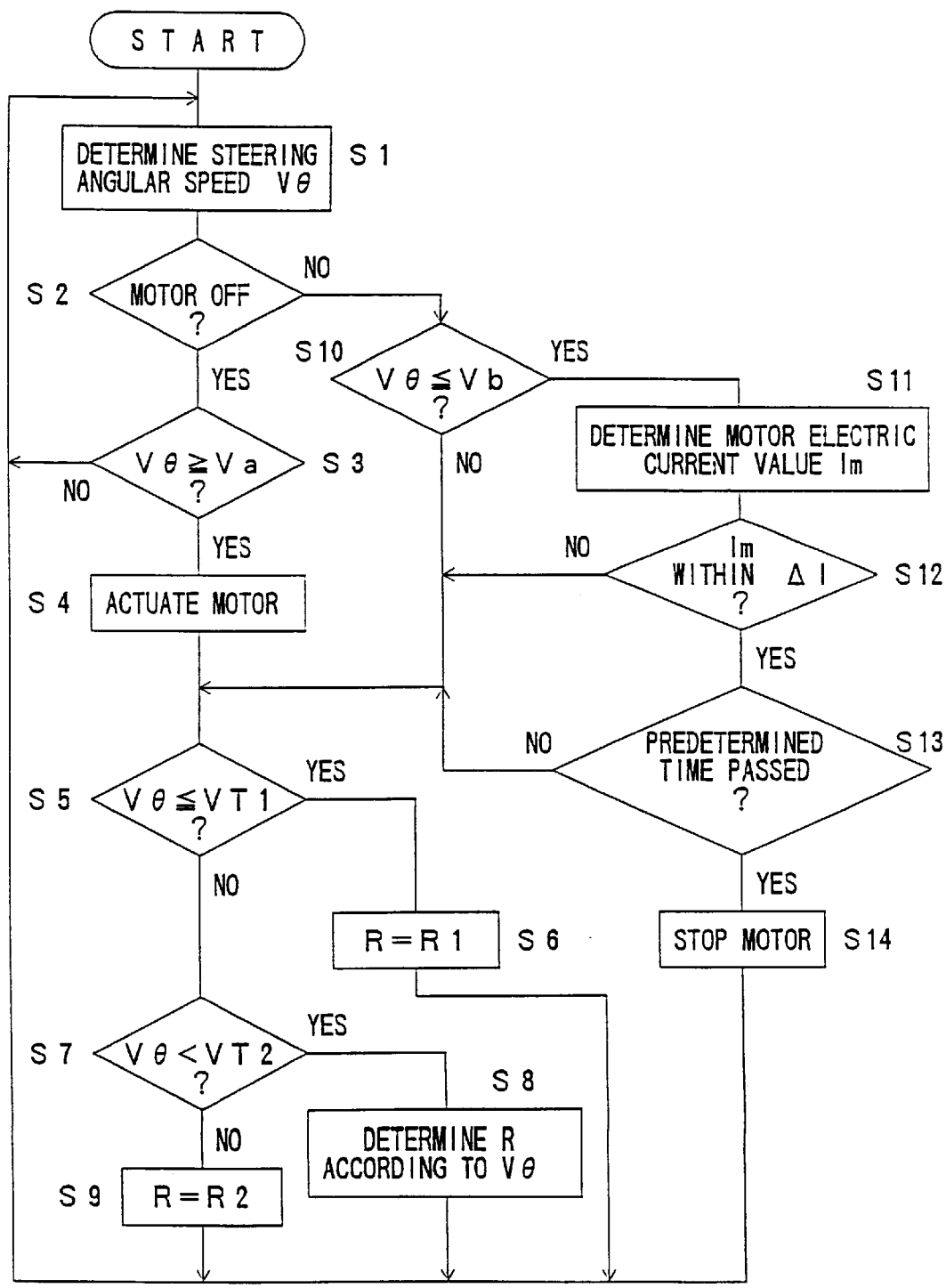
FIG. 2 is a flow chart for explaining drive control of a motor.
Figure 3:
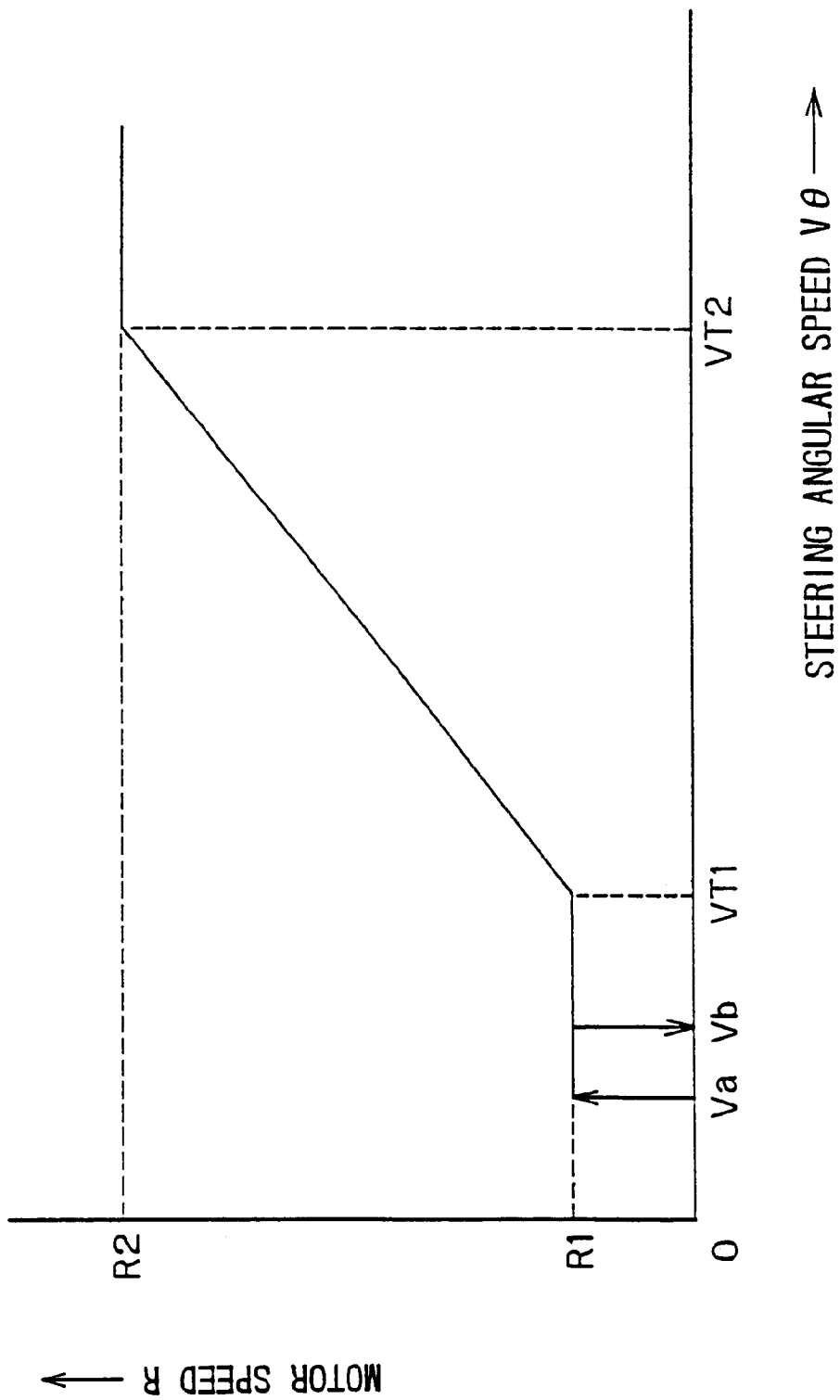
FIG. 3 is a graph illustrating exemplary setting of a motor speed with respect to a steering angular speed.

FIG. 2 is a flow chart for explaining the drive control of the motor 27, and FIG. 3 is a graph showing a relationship between the steering angular speed and the motor speed. On the basis of the steering angle data outputted from the steering angle sensor 11, the CPU 31 determines a steering angular speed $V\theta$ which is the time-related change rate of the steering angle of the steering wheel 2 (Step S1). Then, the CPU 31 judges whether or not the motor 27 is off (Step S2). For this judgment, a flag may be employed, for example, which is to be set when the motor 27 is actuated and reset when the motor 27 is stopped.

If the motor is off (YES in Step S2), the CPU 31 judges whether or not the steering angular speed $V\theta$ thus determined is equal to or greater than a predetermined actuation threshold (third predetermined value) Va (e.g., Va=5 (degree/sec)), in order to determine whether or not the motor 27 is to be actuated (Step S3). If the steering angular speed $V\theta$ is smaller than the actuation threshold Va (NO in Step S3), the program returns to Step S1. If the steering angular speed $V\theta$ is not smaller than the actuation threshold Va (YES in Step S3), the CPU 31 actuates the motor 27 (Step S4). In this case, the CPU 31 determines a motor speed R on the basis of the determined steering angular speed $V\theta$.

In the determination of the motor speed R, the CPU 31 judges whether or not the steering angular speed $V\theta$ is equal to or smaller than a predetermined first threshold (first predetermined value) VT1 (e.g., VT1=10 (degree/sec)) (Step S5). If the steering angular speed Vo is not greater than the first threshold VT1 (YES in Step S5), the motor 27 is driven so that the motor speed R is equated to a first speed R1 (e.g., R1=1800 (speed)) (Step S6). That is, if the steering angular speed $V\theta$ is not smaller than the actuation threshold Va and not greater than the first threshold VT1, the motor 27 is driven constantly at the first speed R1 irrespective of the value of the steering angular speed $V\theta$.

If the steering angular speed $V\theta$ is greater than the first threshold VT1 (NO in Step S5), the CPU 31 judges whether or not the steering angular speed $V\theta$ is smaller than a second threshold VT2 (e.g., VT2=600 (degree/sec)) which is greater than the first threshold VT1 (Step S7). If the steering angular speed $V\theta$ is smaller than the second threshold VT2 (YES in Step S7), the CPU 31 drives the motor 27 at a motor speed R according to the steering angular speed $V\theta$ (Step S8). More specifically, if the steering angular speed $V\theta$ is within a range which is greater than the first threshold VT1 and smaller than the second threshold VT2, the CPU 31 determines the motor speed R so that the motor speed R varies generally linearly with the steering angular speed $V\theta$ between the first speed R1 and a second speed R2 (R2>R1).

If the steering angular speed $V\theta$ is not smaller than the second threshold VT2 (NO in Step S7), the CPU 31 drives the motor 27 so that the motor speed R is equated to the predetermined second speed R2 (e.g., R2=6000 (speed)) (Step S9). That is, if the steering angular speed $V\theta$ is not smaller than the second threshold VT2, the motor 27 is driven constantly at the second speed R2 irrespective of the steering angular speed $V\theta$.

If it is judged in Step S2 that the motor 27 is driven, the CPU 31 judges whether or not the steering angular speed $V\theta$ is equal to or smaller than a predetermined stop threshold (second predetermined value) Vb (e.g., Vb=8 (degree/sec)) (Step S10). If the steering angular speed $V\theta$ is greater than the stop threshold Vb (NO in Step S10), the program goes to Step S5, and the CPU 31 determines the motor speed R on the basis of the value of the steering angular speed $V\theta$, and drives the motor 27 at the motor speed R thus determined.

If the steering angular speed $V\theta$ is not greater than the stop threshold Vb (YES in Step S10), the CPU 31 determines a motor electric current value Im on the basis of the electric current data outputted from the electric current detecting circuit 12 (Step S11). Then, the CPU 31 judges whether or not the motor electric current value Im thus determined is within a motor stop range $\Delta I$ (Step S12). The motor stop range $\Delta I$ is a range of the motor electric current where no steering assist is required, and is determined through a motor stop range determining process to be described later. If the motor electric current value Im is within the motor stop range $\Delta I$ (YES in Step S12), the CPU 31 judges whether or not the motor electric current value Im is kept within the motor stop range $\Delta I$ for a predetermined time period (e.g., 1 to 3 seconds) (Step S13). If this judgment is positive (YES in Step S13), the CPU 31 stops the motor 27 (Step S14) because the steering wheel 2 is considered to be virtually unoperated. On the other hand, if the judgments in Steps S12 and S13 are both negated, the CPU 31 performs the process sequence from Step S5 to determine the motor speed R and drive the motor 27 at the speed thus determined.

Figure 4:
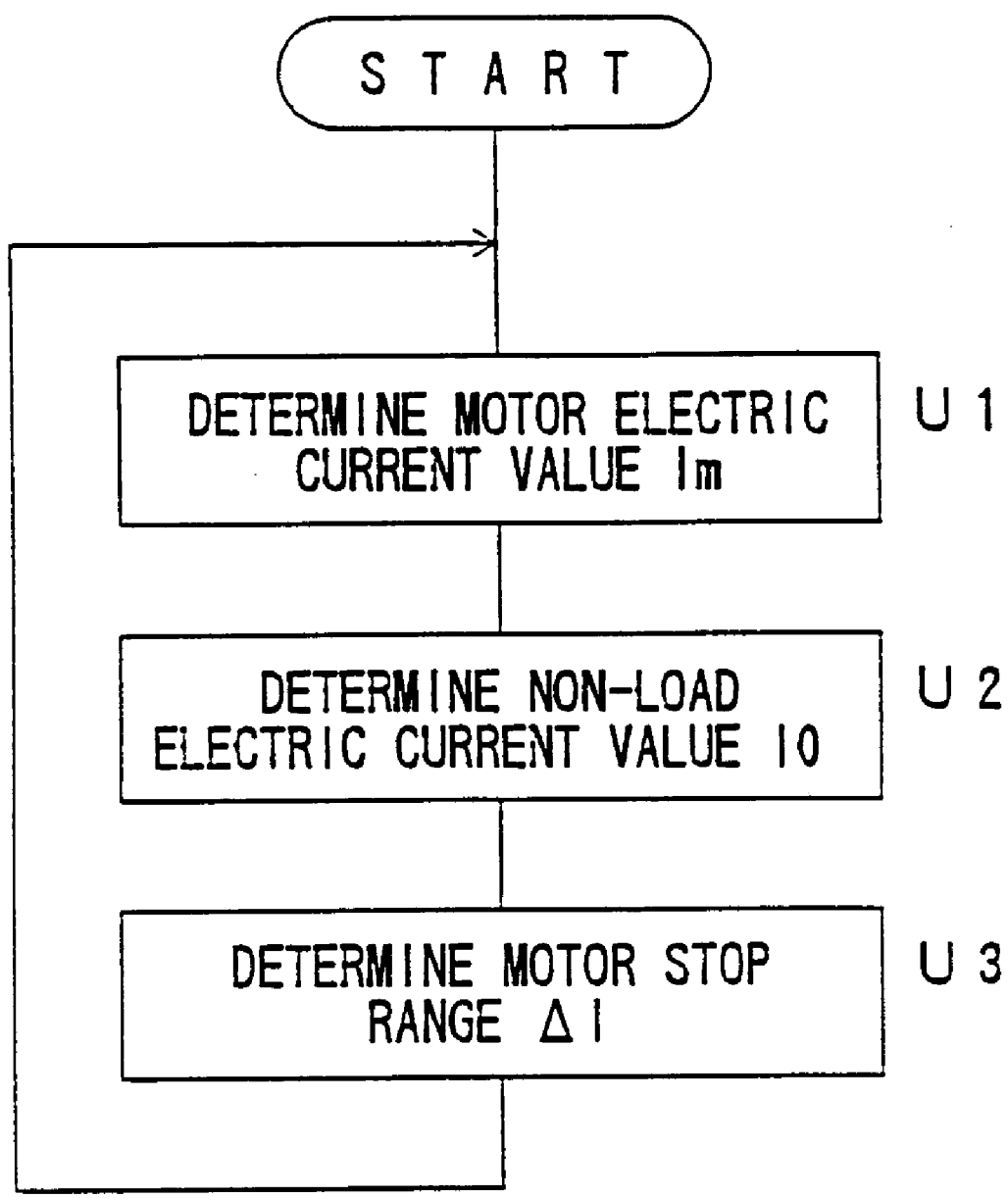
FIG. 4 is a flow chart illustrating a motor stop range determining process.

FIG. 4 is a flow chart for explaining the motor stop range $\Delta I$ determining process. The CPU 31 constantly monitors the motor electric current value Im (Step U1) in view of the fact that the motor electric current value Im varies depending upon the steering torque T. On the basis of the motor electric current value Im, the CPU 31 determines a non-load electric current value I0 which corresponds to a motor electric current value observed when the motor 27 is in a non-load state (Step U2). Then, the motor stop range $\Delta I$ is determined by using the non-load electric current value I0 thus determined (Step U3). More specifically, the CPU 31 determines as the motor stop range $\Delta I$ a range defined between the non-load electric current value I0 thus determined and a value I0 +dI resulting from summation of the non-load electric current value and an electric current threshold dI which is predetermined in accordance with the specifications of the motor vehicle.

Figure 5:
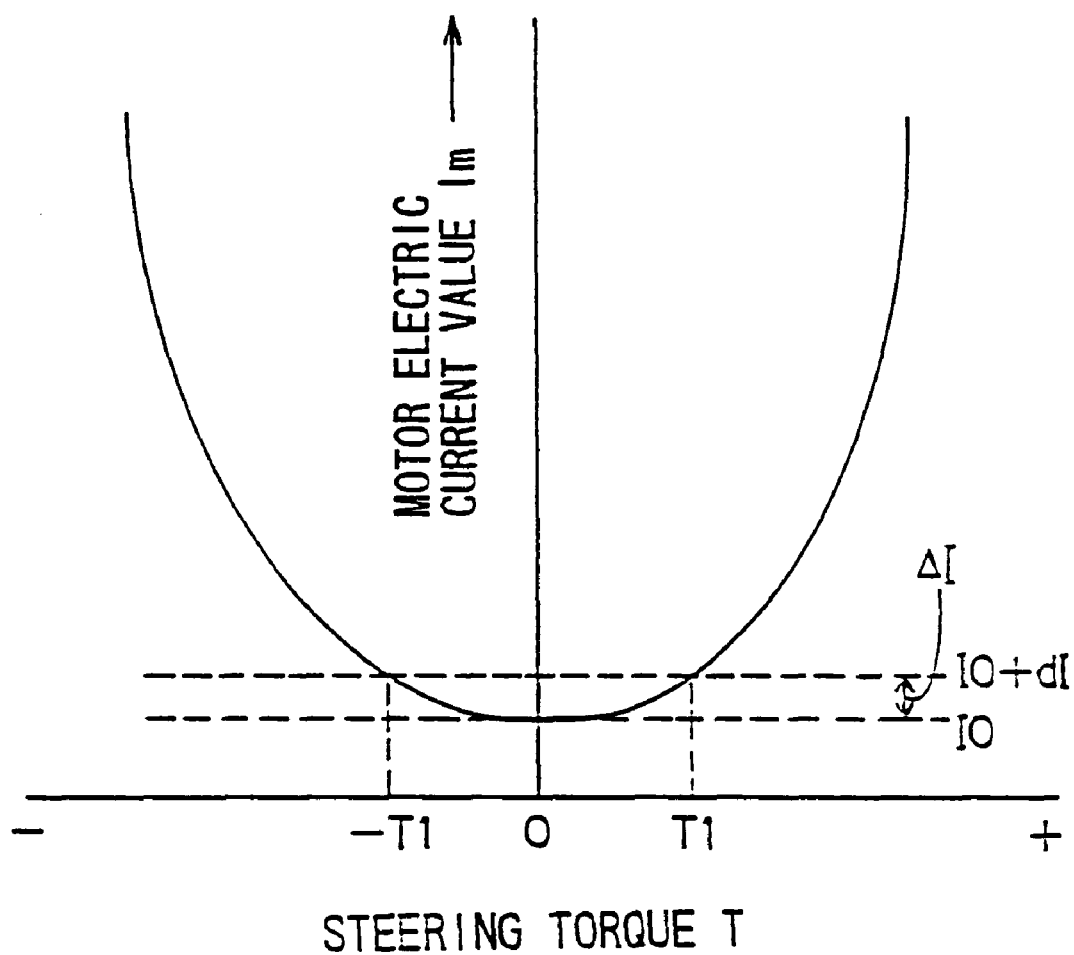
FIG. 5 is a diagram for explaining the motor stop range determining process.

FIG. 5 is a graph showing a relationship between the steering torque T and the motor electric current value Im. The abscissa and the ordinate represent the steering torque T and the motor electric current value Im, respectively. The motor electric current value Im in a range around a steering torque T of zero is expressed by a curve having a local point at T=0. When the steering torque T is zero, the motor 27 is in the non-load state and, therefore, the minimum value of the motor electric current value Im corresponds to the non-load electric current value I0.

On the other hand, a torque range where no steering assist force is required to be applied to the steering wheel 2 is determined by the specifications of the motor vehicle. Provided that the torque range is defined between torque thresholds T1 and −T1 with its midpoint set at zero, a difference between the non-load electric current value I0 and a motor electric current value for these torque thresholds T1, −T1 is preliminarily determined, which is employed as the electric current threshold dI. The range defined between the non-load electric current value I0 and the value I0+dI obtained by adding the electric current threshold dI to the non-load electric current value I0 is considered to be the motor stop range ΔI where the steering wheel 2 is not operated. The electric current threshold dI is preliminarily determined for each type of motor vehicles, and stored in the ROM 33.

The non-load electric current value I0 varies mainly depending on the temperature of the working oil. More specifically, when the temperature of the working oil is low, for example, the working oil has a high viscosity, so that the load on the motor 27 is greater than when the temperature of the working oil is high. Therefore, the motor electric current value Im is high when the temperature of the working oil is low. That is, the Im-T curve in FIG. 5 is shifted upward with the non-load electric current value I0 being increased.

In this embodiment, the non-load electric current value I0 is calculated, and the range between the calculated non-load electric current value I0 and the value I0+dI resulting from the summation of the non-load electric current value I0 and the electric current threshold dI stored in the ROM 33 is defined as the motor stop range ΔI.

The calculation of the non-load electric current value I0 is achieved, for example, by determining the most frequent electric current value out of sampled motor electric current values Im. More specifically, the CPU 31 samples electric current data outputted from the electric current detecting circuit 12 over a predetermined time period (e.g., 10 (min) to 1 (hour)) on condition that the motor speed R is kept constant. The motor electric current values Im determined on the basis of the electric current data obtained through the sampling have a normal distribution. In this case, a motor electric current value Im at a steering torque of zero is the most frequent electric current value, which is employed as the non-load electric current value I0.

Otherwise, the minimum electric current value, which is determined out of motor electric current values Im sampled by a predetermined number of times or during a predetermined time period on condition that the motor speed R is kept constant, may be employed as the non-load electric current value I0.

In accordance with the first embodiment described above, the motor 27 is stopped when no steering assist is required, so that wasteful energy consumption can be suppressed. Therefore, the power steering apparatus can ensure energy saving.

Further, the steering angular speed Vθ and the motor speed R have so-called hysteresis characteristics in a range where the steering angular speed Vθ is not greater than the first threshold VT1. More specifically, the threshold Va for the actuation of the motor is set smaller than the threshold Vb for the stop of the motor. Thus, a steering assist force can immediately be generated when the steering operation is started, and the steering assist can immediately be stopped when the steering operation ends. Hence, the improvement of the steering feeling and the enhancement of the energy saving can both be achieved.

Figure 6:
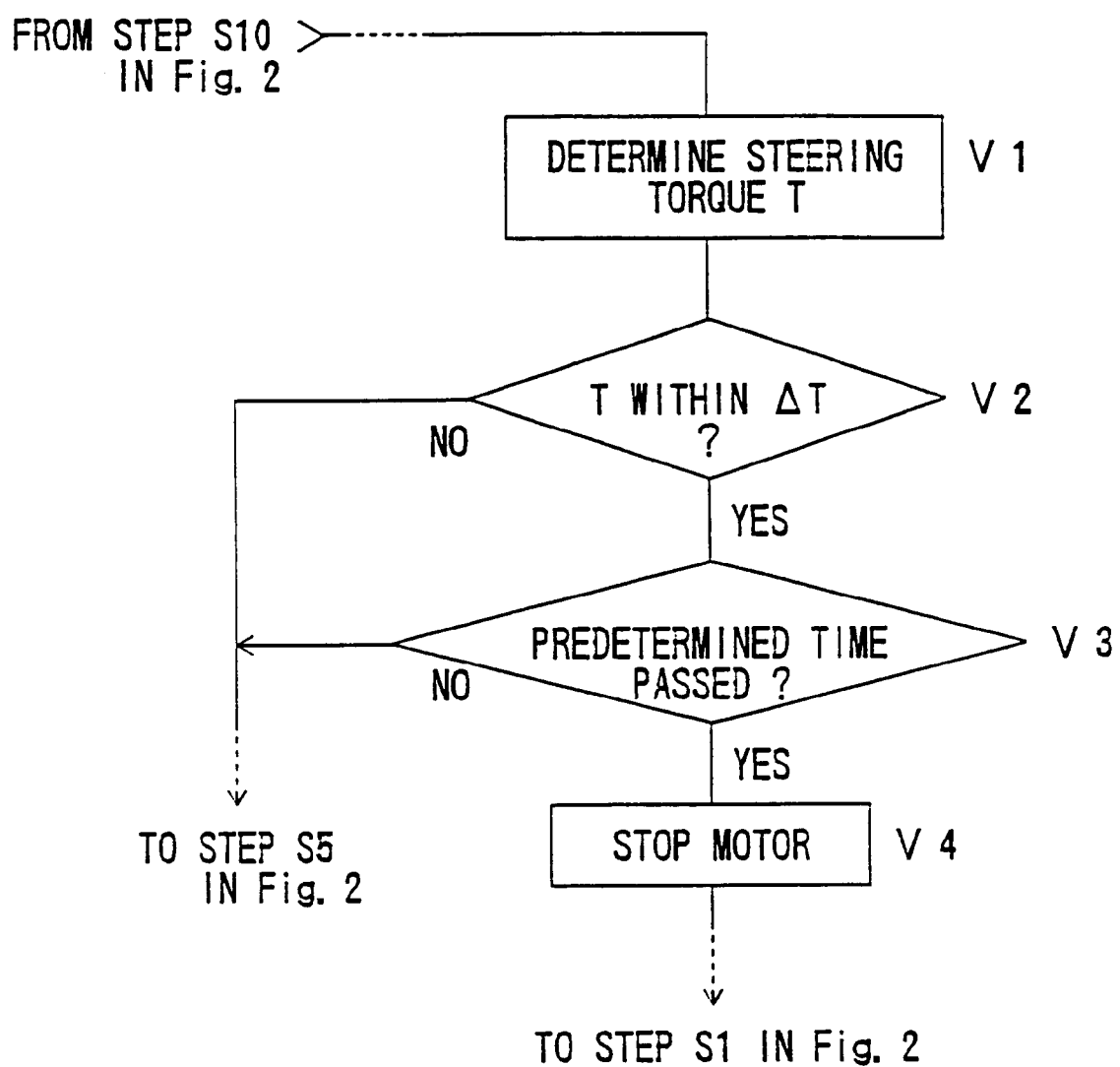
FIG. 6 is a flow chart for explaining stop control of the motor in accordance with a second embodiment of the present invention.
Figure 7:
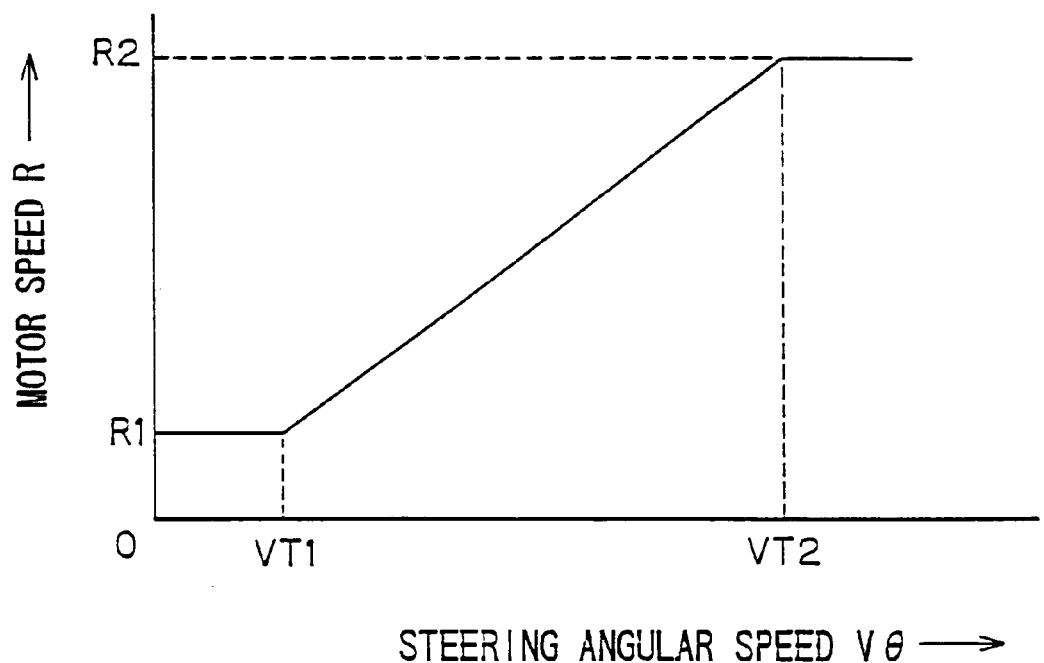
FIG. 7 is a diagram for explaining a conventional motor drive control.

FIG. 6 is a flow chart for explaining the stop control of the motor 27 according to a second embodiment of the present invention, and the flow chart is to be replaced with Steps S11 to S14 in FIG. 2.

In accordance with the second embodiment, the power steering apparatus includes a torque sensor 13 provided in association with the torsion bar 9 as indicated by a phantom line in FIG. 1. The torque sensor 13 outputs torque data according to the direction and magnitude of a torsion of the torsion bar 9 to the electronic control unit 30. When the steering angular speed Vθ is not greater than the stop threshold Vb, the CPU 31 uses the torque data outputted from the torque sensor 13 to judge whether or not the motor 27 is to be stopped.

This will hereinafter be described in greater detail. If it is judged in Step S10 in FIG. 2 that the steering angular speed Vθ is not greater than the stop threshold Vb, the CPU 31 determines the steering torque T on the basis of the torque data outputted from the torque sensor 13 (Step V1). Then, the CPU judges whether or not the steering torque T is within a predetermined steering torque range ΔT (Step V2). The steering torque range ΔT is preliminarily determined on the basis of the specifications of the motor vehicle as a range where application of a steering assist force is not required, and preliminarily stored in the ROM 33.

If the steering torque T is at a value within the steering torque range ΔT (YES in Step V2), the CPU 31 judges whether or not the steering torque is kept within the steering torque range ΔT for a predetermined time period (e.g., 1 to 3 seconds) (Step V3). If this judgment is positive (YES in Step V3), the CPU 31 stops the motor 27 (Step V4). On the other hand, if the judgments in Steps V2 and V3 are both negated, the CPU 31 performs the process sequence from Step S5 in FIG. 2 to determine the motor speed R and drive the motor 27 at the speed thus determined.

In accordance with the second embodiment, the motor 27 is thus stopped when no steering assist is required, so that wasteful energy consumption can be suppressed. Therefore, the power steering apparatus can ensure energy saving.

Although two embodiments of the present invention have thus been described, the present invention can, of course, be embodied in any other forms. For example, the stop control of the motor 27 may be performed by employing a vehicle speed sensor, wherein the motor 27 is stopped on condition that the steering angular speed Vθ is not greater than the stop threshold Vb, that a vehicle speed detected by the vehicle speed sensor is not lower than a predetermined value, and that the steering angle of the steering wheel 2 is kept at a value close to a steering angle midpoint for not less than a predetermined time period. This is possible because, where the vehicle speed is not lower than the predetermined value and the steering angle is kept at a value close to the steering angle midpoint for not less than the predetermined time period, it is considered that the motor vehicle travels straight and, hence, no steering assist is required. In this case, the electric current detecting circuit 12 and the torque sensor 13 are not necessary for the purpose of the stop control of the motor 27.

Detection of the steering angle midpoint can be achieved by sampling steering angle data outputted from the steering angle sensor 11, preparing a histogram of the steering angle data, and determining the most frequent steering angle data as steering angle data of the steering angle midpoint after a predetermined number of data are sampled.

Further, it is not necessary to independently define motor stop conditions for the motor electric current value Im, the steering torque T, the vehicle speed and the steering angle. For example, the motor stop conditions for the motor electric current value Im, the steering torque T, the vehicle speed and the steering angle may arbitrarily be employed in combination, whereby the motor 27 is stopped if all or at least one of the conditions is satisfied.

INDUSTRIAL APPLICABILITY

As previously described, the power steering apparatus according to the present invention is used for applying a steering assist force to a steering mechanism of a motor vehicle.

What is claimed is:

1. A power steering apparatus for generating a steering assist force by a hydraulic pressure generated by a pump driven by an electric motor, comprising:

steering angular speed detecting means for detecting a steering angular speed;

first control means for variably setting a speed of the electric motor in accordance with the steering angular speed detected by the steering angular speed detecting means if the steering angular speed is greater than a first predetermined value;

second control means for setting the speed of the electric motor at a predetermined constant speed if the steering angular speed detected by the steering angular speed detecting means is between the first predetermined value and a second predetermined value which is smaller than the first predetermined value; and third control means for stopping the electric motor on a predetermined condition if the steering angular speed detected by the steering angular speed detecting means is not greater than the second predetermined value.

2. A power steering apparatus as set forth in claim 1, further comprising fourth control means for actuating, when the electric motor is off, the electric motor if the steering angular speed detected by the steering angular speed detecting means is increased to not smaller than a third predetermined value which is smaller than the second predetermined value.

3. A power steering apparatus as set forth in claim 2, further comprising:

electric current detecting means for detecting a value of motor electric current flowing through the electric motor; and electric current value judging means for judging whether or not the motor electric current value detected by the electric current detecting means is within a motor stop range which corresponds to a steering torque range where no steering assist is required;

wherein the predetermined condition is duration of a predetermined time period during which the electric current value judging means continuously obtains a judgment result that the motor electric current value is within the motor stop range.

4. A power steering apparatus as set forth in claim 2, further comprising:

torque detecting means for detecting a steering torque; and torque judging means for judging whether or not the steering torque detected by time torque detecting means is within a motor stop torque range where no steering assist is required;

wherein the predetermined condition is duration of a predetermined time period during which the torque judging means continuously obtains a judgement result that the steering torque is within the motor stop torque range.

5. A power steering apparatus as set forth in claim 1, further comprising:

electric current detecting means for detecting a value of motor electric current flowing through the electric motor; and electric current value judging means for judging whether or not the motor electric current value detected by the electric current detecting means is within a motor stop range which corresponds to a steering torque range where no steering assist is required;

wherein the predetermined condition is duration of a predetermined time period during which the electric current value judging means continuously obtains a judgment result that the motor electric current value is within the motor stop range.

6. A power steering apparatus as set forth in claim 5, further comprising:

non-load electric current value calculating means for determining, on the basis of the motor electric current value detected by the electric current detecting means, a non-load electric current value observed when the electric motor is in a non-load state; and motor stop range determining means for determining the motor stop range on the basis of the non-load electric current value determined by the non-load electric current value calculating means.

7. A power steering apparatus as set forth in claim 6, wherein the motor stop range determining means determines as the motor stop range a range defined between the non-load electric current value and a value obtained by adding a predetermined electric current threshold to the non-load electric current value.

8. A power steering apparatus as set forth in claim 1, further comprising:

torque detecting means for detecting a steering torque; and torque judging means for judging whether or not the steering torque detected by the torque detecting means is within a motor stop torque range where no steering assist is required;

wherein the predetermined condition is duration of a predetermined time period during which the torque judging means continuously obtains a judgment result that the steering torque is within the motor stop torque range.

* * * * *